(12) United States Patent
Stempel et al.

(10) Patent No.: US 7,576,922 B2
(45) Date of Patent: Aug. 18, 2009

(54) HERMETIC ELECTROWETTING DEVICE

(75) Inventors: Marianne Stempel, Lyons (FR);
Frédéric Laune, Villefontaine (FR);
Stéphane Roux, Lyons (FR)

(73) Assignee: Varioptic S.A., Lyons (FR)

( * ) Notice: Subject to any disclaimer, the term of this patent is extended or adjusted under 35 U.S.C. 154(b) by 342 days.

(21) Appl. No.: 11/609,638

(22) Filed: Dec. 12, 2006

(65) Prior Publication Data

US 2007/0133103 A1 Jun. 14, 2007

(30) Foreign Application Priority Data

Dec. 13, 2005 (EP) .................................. 05112056

(51) Int. Cl.
*G02B 1/06* (2006.01)

(52) U.S. Cl. ...................... 359/665; 359/666; 277/944; 277/945; 277/946

(58) Field of Classification Search ......... 359/665–667; 277/944–946
See application file for complete search history.

(56) References Cited

U.S. PATENT DOCUMENTS 5,973,852 A * 10/1999 Task ............................ 359/665

* cited by examiner

*Primary Examiner*—Evelyn A. Lester
(74) *Attorney, Agent, or Firm*—Osha • Liang LLP

(57) ABSTRACT

The invention concerns an electrowetting device comprising first and second immiscible fluids, the liquids being sealed within a structure comprising a cap portion, a base portion, a gasket formed of a first material positioned between a first contact surface on said cap portion and a second contact surface on said base portion, and a first film formed of a second material between said gasket and one of said first contact surface and said second contact surface.

22 Claims, 4 Drawing Sheets

HERMETIC ELECTROWETTING DEVICE

FIELD OF THE INVENTION

The present invention relates to an electrowetting device, in particular a liquid lens, and a method of fabricating the same. In particular, the present invention relates to sealing two parts of an electrowetting device.

BACKGROUND OF THE INVENTION

A number of embodiments of variable focus liquid lenses are described in commonly assigned European patent No1166157. FIG. 1 of the present application corresponds to FIG. 12 of that patent. As shown in FIG. 1, an optical lens comprises two insulating transparent plates 100 and 102. Plate 102 comprises a conical or cylindrical recess, with a side face 104 inclined with respect to the optical axis Δ of the device, and which receives a drop of an insulating liquid 106. The remainder of the chamber extending up to transparent plate 100 is filled with a second liquid 108, which is conductive. The liquids are immiscible, and have different refraction indexes but roughly the same density. A transparent electrode 110 is formed over the outer surface of transparent plate 102. Another electrode 112 is provided in contact with a liquid 108.

Due to the electrowetting effect, it is possible, by applying a voltage between electrodes 110 and 112, to change the curvature of the interface between the first liquid 106 and the second liquid 108, for example, from an initial concave shape as shown by line A, to a convex shape as shown by line B. Thus rays of light passing through the cell perpendicular to the plates 100 and 102 in the region of the drop 106 will be focused more or less depending on the voltage applied.

When manufacturing a variable lens as shown in FIG. 1, it is necessary for the electrode 110 to be electrically insulated from the conducting liquid 108, and also for the liquids to be tightly sealed within a container.

International patent application WO 2005/073779 shows a variable focus lens package using sealing rings to seal the fluid chamber and thus preventing fluids to leak out of said chamber.

But the applicant has shown that the pressure applied by the liquids on their container can be very high during the manufacturing process or during subsequent use due to the manufacturing process or if the device is subjected to high temperature. If an inadequate seal is provided, liquid can escape the lens thus resulting in a degradation of the optical performance of the lens. Therefore, a specific seal is required, that can undergo the pressure applied by the liquids. Furthermore, the liquids 108 and 106 can be corrosive to certain materials, making many materials unsuitable for sealing the lens, thus limiting the choice of materials that can be used.

There is thus a need for a variable lens housing and a method of manufacturing the same, which provide a very hermetic seal so as to prevent leakage during the life of the lens, including when the pressure applied by the liquids is high, still keeping the lens easy to manufacture.

SUMMARY OF THE INVENTION

It is one object of the present invention to provide an electrowetting device and a method for manufacturing the same, which addresses the above needs.

According to a first aspect of the present invention there is provided an electrowetting device, comprising first and second immiscible fluids defining an interface moveable by electrowetting, the liquids being sealed within a structure comprising a cap portion, a base portion, a gasket formed of a first material positioned between a first contact surface on the cap portion and a second contact surface on the base portion, a first film formed of a second material between the gasket and one of the first contact surface and the second contact surface.

According to a further aspect of the present invention there is provided a method of manufacturing an electrowetting device that contains first and second immiscible fluids, the method comprising providing a cap portion having a first contact surface, a base portion having a second contact surface and a gasket formed of a first material having a first side for contact with said first contact surface and a second side for contact with said second surface, forming at least a first film of second material on at least one of the first contact surface, the first side of the gasket, the second contact surface, and the second side of the gasket, positioning the gasket between the cap portion and the base portion and positioning the first and second fluids between the base and cap portions; and applying an amount of pressure such that the gasket and the first film are compressed sufficiently to create a seal between the cap portion and the base portion for sealing said first and second fluids within.

According to a further aspect of the present invention there is provided a variable focus lens, comprising first and second immiscible fluids having different refractive indices, defining a light-focusing interface moveable by electrowetting, the liquids being sealed within a structure comprising a cap portion, a base portion, a gasket formed of a first material positioned between a first contact surface on said cap portion and a second contact surface on the base portion, a first film formed of a second material between the gasket and one of the first contact surface and the second contact surface.

According to yet a further aspect of the present invention, there is provided an optical diaphragm, comprising first and second immiscible fluids, defining an interface moveable by electrowetting, the liquids being sealed within a structure comprising a cap portion, a base portion, a gasket formed of a first material positioned between a first contact surface on said cap portion and a second contact surface on said base portion, and a first film formed of a second material between said gasket and one of said first contact surface and said second contact surface.

According to a further aspect of the present invention there is provided a camera module comprising the electrowetting device, the variable focus lens or the optical diaphragm as described above. According to further aspects of the present invention a mobile phone is provided comprising the camera module described above.

Further objects, features and advantages of the present invention will become apparent from the following detailed description of exemplary preferred embodiments, when considered together with the accompanying figures of drawing.

BRIEF DESCRIPTION OF THE DRAWINGS

In the drawings.

For clarity, throughout the figures, like reference numbers have been used for corresponding features. The figures are not drawn to scale.

DETAILED DESCRIPTION OF PREFERRED EMBODIMENTS

Figure 2:
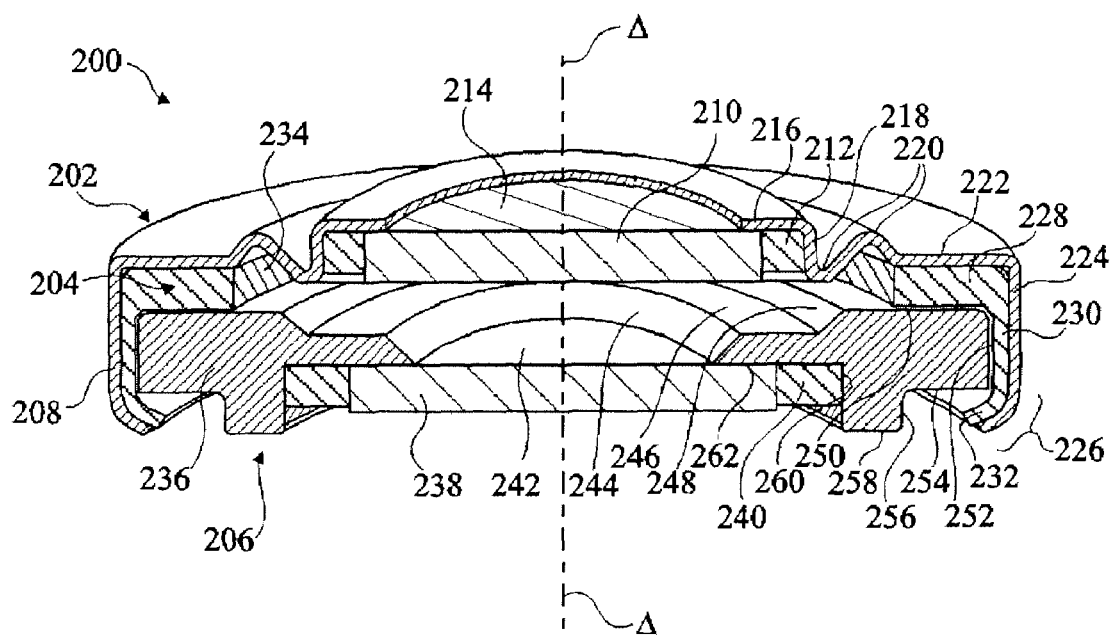
FIG. 2 is a perspective view of a cross-section of an embodiment of a variable focus liquid lens according to the present invention.

FIG. 2 illustrates a cross-section perspective view of an embodiment of a variable focus liquid lens. The lens 200 comprises a cap portion 202, a gasket 204 and a base portion 206, the cap portion 202 being placed over the base portion 206 but separated from it by gasket 204.

Cap portion 202 comprises a metal cap 208 formed from a thin sheet of conducting metal, to which a disc shaped glass window 210 is sealed, for example, by a seal 212 formed by glue. The cap has a circular opening 214 allowing light to pass through to glass window 210. Circular opening 214 is centered on the optical axis Δ of the lens, and is on a plane perpendicular to the optical axis Δ.

The sheet metal of the metal cap 208 has been molded or pressed into a shape having a number of portions rotationally symmetric to optical axis Δ. Moving outwardly from the optical axis, the metal cap 208 comprises an annular flat portion 216 surrounding the opening 214 and being preferably perpendicular to the optical axis Δ. A first part of the inner surface of portion 216 contacts the outer surface of window 210, and a radially outer part of the inner surface of portion 216 contacts with the outer edge of window 210 and seal 212. The outer edge of portion 216 is curved to form an edge 218 that extends approximately at a right-angle, parallel to the optical axis Δ and that extends from portion 216 toward the base portion 206. This edge also preferably contacts with seal 212. According to this embodiment, from edge 218, a substantially "S" shaped portion 220 extends away from optical axis Δ, linking edge 218 to a further annular flat portion 222 that preferably extends at least substantially perpendicular to optical axis Δ. This "S" shaped portion 220 is designed to allow some movement of window 210 when pressure is exerted by fluids inside the lens, but only movement in a direction parallel to the optical axis Δ.

A right-angled bend from portion 222 links to an annular rim portion 224 extending at least substantially parallel to optical axis Δ, which forms the outer rim of the lens, surrounding the gasket 204 and base portion 206. The end part of portion 224, which is the outer edge of the metal sheet forming the metal cap 208, is preferably inwardly curved at region 226 towards the optical axis Δ by crimping, such that it holds the gasket 204 and base portion 206 in place. This crimping is preferably performed around the entire circumference of the lens. Crimping this edge provides the required pressure between the cap and base portion, while keeping the manufacturing process simple and low cost.

Thus, metal cap 208 preferably comprises a raised central housing formed from portions 216 and 218 for receiving the glass window 210, and a larger lower housing formed from portions 222 and 224, for receiving the gasket 204 and base portion 206. Most preferably, these housings are separated by the "S" shaped portion 220.

Preferably, gasket 204 is formed of a polymer and is annular and substantially "L" shaped in cross section, such that an outer surface of a first leg or limb 228 of the "L" lies in contact with and parallel to the inner surface of annular flat portion 222 of the metal cap 208, and an outer surface of a second leg or limb 230 of the "L" lies in contact with and parallel to the inner surface of rim portion 224 of the metal cap 208, thus increasing the contact surface. Other shapes for the gasket 204 are possible, for example, in some embodiments the gasket may comprise only the first limb 228. The inner surfaces of the first and second limbs 228, 230 contact surfaces of the base portion 206, as will be explained in more detail below. A region 232 at the end of the second limb 230 is curved inwardly toward the optical axis Δ by pressure applied by crimped region 226 of the metal cap 208, and the inner surface of gasket 204 at this point applies pressure on a corner of the base portion 206, holding it in place. End surface 234 of first limb 228 faces the optical axis Δ, and is exposed to the inner chamber of the lens.

Base portion 206 preferably comprises an annular electrode 236, formed of a conducting material, preferably a metal, to which a disc shaped glass window 238, positioned generally perpendicularly to optical axis Δ, is adhered and sealed by seal 240, e.g., of glue or adhesive. An opening 242 is formed in the annular electrode 236, centered on optical axis Δ, to allow light to pass through glass window 238, to or from the lens. The glass window 238 is positioned on the outside of this opening. The annular electrode 236 is molded or machined in a ring shape having a number of surfaces that are preferably rotationally symmetrical with respect to optical axis Δ, which will now be described in more detail.

The inner edge 244 of the annular electrode 206 surrounding opening 242 is preferably an inclined surface, for example, at approximately 45 degrees to the optical axis, facing up into the lens. Adjacent to and surrounding edge 244 is an annular flat portion 246, also generally perpendicular to optical axis Δ, and adjacent to this is a further inclined edge 248, again facing into the lens and being approximately parallel to edge 244. Adjacent to inclined edge 248 and surrounding it is an annular flat surface 250, an inner part of which is exposed to the inner chamber of the lens, and an outer part of which provides a first contact surface in contact with the inner surface of limb 228 of gasket 204. Adjacent to surface 250 is an edge surface 252, generally parallel to optical axis Δ, which preferably provides a second contact surface in contact with the inner surface of limb 230 of gasket 204. An annular flat outer surface 254 adjacent to edge surface 252 faces out from the lens and extends back toward the optical axis Δ. The generally right-angled corner between edge surface 252 and outer surface 254 is the corner that preferably contacts the inner region of gasket 204, that is curved by crimped region 226 of the metal cap 208. A further surface 256 adjacent to outer surface 254 extends out from the lens, generally parallel to optical axis Δ, and adjacent to surface 256 an annular surface 258 that is generally perpendicular to optical axis Δ extends inwardly toward the optical axis Δ. A radially inwardly facing surface 260 extends generally parallel to the optical axis Δ adjacent to surface 258 and extends back toward the inner chamber of the lens. Surface 260 is adjacent to an annular flat surface 262, also generally perpendicular to optical axis Δ, which terminates at edge 244 at the inner edge of the annular electrode. A radially inner part of surface 262 contacts glass window 238, and a radially outer part of surface 262 contacts with seal 240, which holds the window 238 in place.

Thus annular electrode 236 preferably comprises contact surfaces 260, 262 for receiving window 238, an inclined edge 244 for receiving a drop of a first fluid, as will be explained in more detail below, first and second contact surfaces 250, 252 for contacting with the inner surfaces of gasket 204, and a corner between surfaces 252 and 254 for contacting with the curved portion 232 of gasket 204, thereby holding the annular electrode 236 in place.

Although not shown in FIG. 2, lens 200 contains first and second immiscible fluids within the inner chamber formed between the windows 210 and 238. A drop of a first fluid, which is a dielectric, is positioned covering the opening 242 of electrode 236 on the surface of glass window 238. This fluid for example, comprises an oil. The edges of the drop preferably fall within a part of surface 244 of electrode 236. A second fluid, which is conducting and, for example, comprises water mixed with an electrolyte such as a salt, fills the remaining volume of the chamber. Neither of the first and second fluids makes direct contact with the exposed surfaces of electrode 236 which have been covered with an insulating layer, as will be explained in more detail below. The second conducting fluid contacts the "S" shaped region 220 of the metal cap 208, which is exposed to the inner chamber, making electrical contact therewith.

Figure 1:
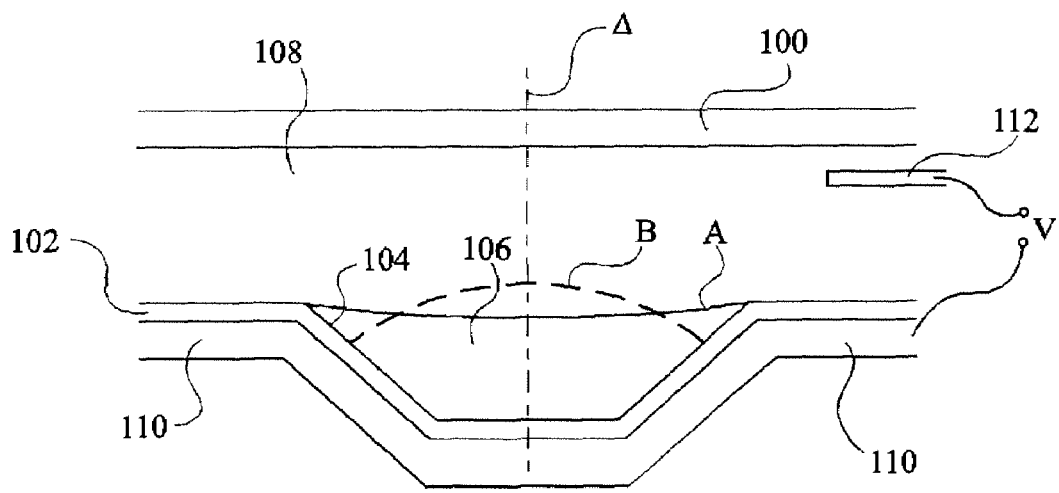
FIG. 1 illustrates schematically an embodiment of a known variable focus liquid lens.

In operation, the lens functions in similar fashion to the device of FIG. 1. A voltage, which is preferably oscillating, is applied between electrode 236 and the metal cap 208, the metal cap 208 functioning as the second electrode and making contact with the conducting fluid. This voltage alters the curvature of the interface between the first fluid and the second fluid, due to the electrowetting effect which increases the wettability of edge 244 by water. The first and second fluids have different refractive indices, such that light is refracted at their interface. Light passes through the windows 210 and 238, passing through the interface between the fluids. In this embodiment it is not necessary for the electrode 236 to extend across the glass surface of window 238 under the drop as is the case with electrode 110 in FIG. 1, as the edge of the interface is not designed to leave edge 244.

The seal between metal cap 208 and electrode 236 is required to be very strong, in order to contain the first and second fluids without any leakage. This is partly achieved by providing the polymer gasket 204, sandwiched between the metal cap 208 and the electrode 236. However, the applicant has shown that gasket 204 on its own may result in some leakage around the sides of the gasket, especially during the manufacturing process or if the device is subjected to high temperature.

According to the invention, films are formed between the surfaces of gasket 204 and the contact surfaces of the cap and/or base portions where contact is made between these surfaces. The film is made of a material with mechanical properties different from the mechanical properties of the material constituting the gasket (e.g. hardness, tensile strength, elongation). Advantageously, the film is a polymer film. The applicant has shown that forming said film of different mechanical properties will increase the contact between contacting surfaces of the gasket 204 with the metal cap 208 and/or electrode 236. As a matter of fact, it appears that the contacting surfaces of the gasket 204 with the metal cap 208 and electrode 236 do not make perfect contact due to the roughness of these surfaces resulting in tiny channels through which liquids or air may slowly pass, resulting in some leakage around the sides of the gasket due to capillary action.

The steps of forming the variable focus liquid lens of FIG. 2, and in particular the gasket and polymer films, will now be described in relation to FIGS. 3, 4 and 5.

Figure 3A:
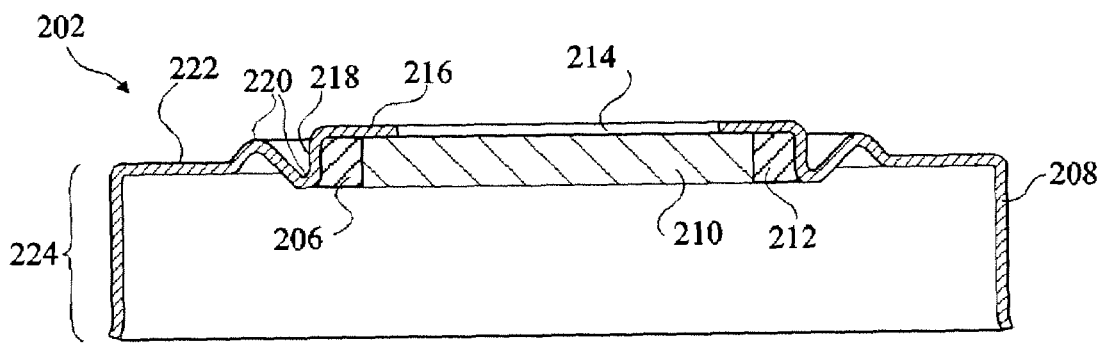
FIGS. 3A, 3B and 3C are schematic cross-sectional views of the cap portion, gasket and base portion respectively of the variable focus liquid lens according to the embodiment of FIG. 2, during one step of manufacture according to the present invention.
Figure 3B:
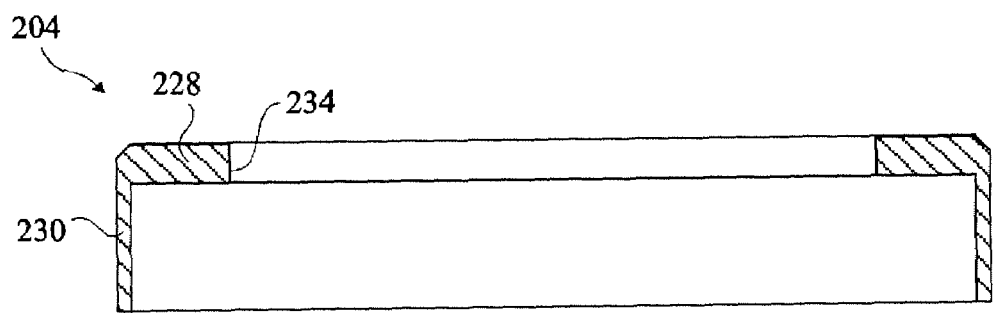
Figure 3C:
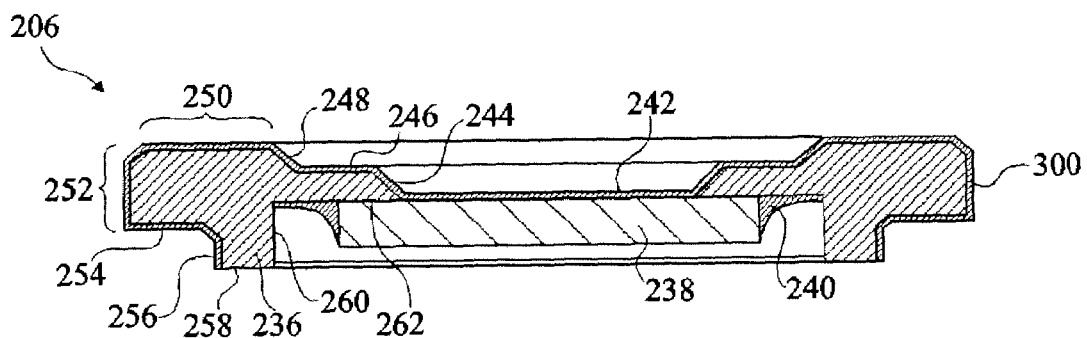

FIGS. 3A, 3B and 3C illustrate, respectively, cross-sectional views of the cap portion 202, gasket 204 and base portion 206 of the device 200 at one step during fabrication of the device.

Referring to FIG. 3A, metal cap 208 is formed of a sheet of metal alloy, such as stainless steel, and is pressed into shape, having a rim portion 224 which has yet to be crimped and is therefore straight, a flat portion 222, a rippled "S" shaped portion 220, a flat portion 216 and an opening 214. These features are preferably arranged in the manner explained in relation to FIG. 2, and this arrangement will therefore not be described again. Glass window 210 is glued into position with glue seal 212, which contacts inner sides of portions 218 and 216.

Referring to FIG. 3B, gasket 204 is preferably formed of a polymer material and is molded or machined into shape, forming a ring that is approximately "L"-shaped in cross section, as described in relation to FIG. 2. It comprises first and second legs or limbs 228 and 230. Assuming an overall 10 mm lens diameter, limb 228 is approximately 0.5 mm in thickness, and limb 230 is approximately 0.2 mm in thickness. At the outer corner between the first and second limbs 228, 230 the right-angle corner edge has preferably been removed, for example, leaving an inclined or beveled edge, such that the gasket will more easily fit within the inner surfaces of portions 224 and 222 of the metal cap 208.

FIG. 3C shows the base portion 206, which comprises annular electrode 236 formed of a metal alloy, such as stainless steel, and is preferably molded or machined in the shape described with relation to FIG. 2, which will not be described again in detail. However, as can be seen from the figure, the corner between contact surfaces 250 and 252, which contact the inner surface of the gasket, has been removed to ensure a good contact between the surfaces. Window 238 is preferably glued to surface 262 of the annular electrode 236, to provide seal 240. As shown in FIG. 3C, an insulation layer 300, which is, for example, a polymer, is applied to the top and sides of the base portion 206, that is to surfaces 256, 254, 252, 250, 248, 246, 244 and across the surface of the window 238, to ensure that electrowetting is effective.

Figure 4A:
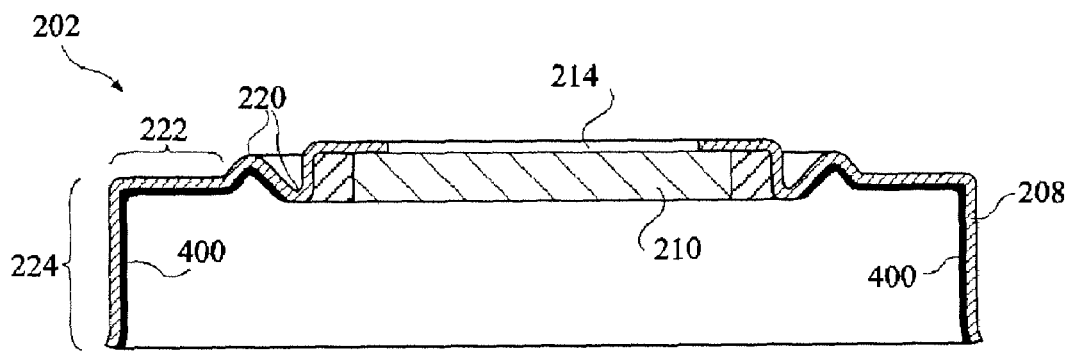
FIGS. 4A, 4B and 4C are schematic cross-sectional views of the cap portion, gasket, and base portion of the liquid lens embodiment of FIG. 2 during a further step of manufacture according to the present invention.
Figure 4B:
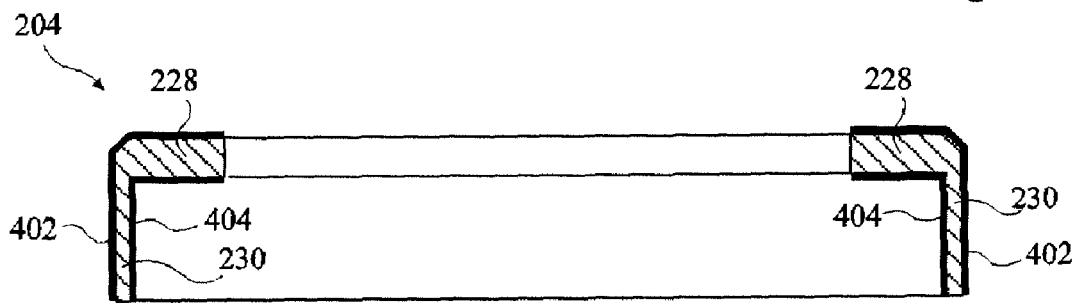
Figure 4C:
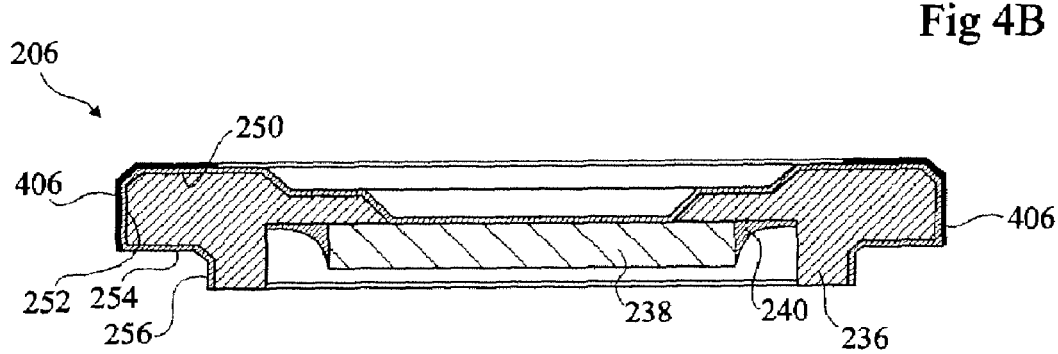

FIGS. 4A, 4B and 4C illustrate the formation of the soft polymer coating on the cap portion 202, the gasket 204 and the base portion 206, respectively. It should be noted that it is not necessary that a polymer coating is formed on all of these surfaces, as sealing is improved by the application of a film on just one of these surfaces. However, most preferably a coating is formed on both sides of gasket 204, to ensure a good seal between the gasket and both the cap and base portions.

Referring to FIG. 4A, a soft polymer coating 400 is applied to the exposed inner surfaces of the metal cap 208 that will contact with gasket 204, in other words over the inner surfaces of portions 224 and 222, and on at least a portion of the inner part of "S" shaped portion 220.

Referring to FIG. 4B, gasket 204 is coated on both outer and inner surfaces with soft polymer coatings 402 and 404, respectively. These are the regions that will be in contact with the metal cap 208 and the base portion 206, respectively.

Referring to FIG. 4C, a polymer coating 406 is applied to the outer edge surface 252 and top surface 250 of the annular electrode 236, over the insulation layer 300. These surfaces are the surfaces that will contact with gasket 204 when the device is assembled.

Forming a film between the gasket and the contact surface of the cap portion and/or base portion improves the sealing without making the manufacturing process more complicated since the film can be made by coating, as explained above, and no further mechanical piece needs to be provided.

Figure 5:
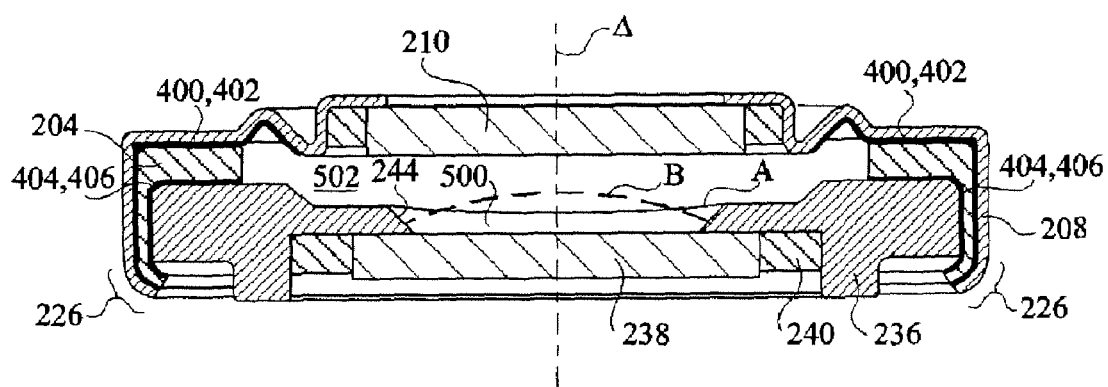
FIG. 5 is a schematic cross-sectional view of the assembled variable focus liquid lens of FIG. 2 according to one embodiment of the present invention.

As shown in FIG. 5, the lens components are then assembled, and during assembly fluids are sealed within the lens. This can preferably be achieved by injecting a drop of the required quantity of the first insulating fluid 500 into position within edge 244, while immersing the cap portion 202, gasket 204 and base portion 206 in the second conducting fluid 502. The gasket 204 is placed in position over base portion 206, and then base portion 206 and gasket 204 are placed in position within cap portion 202. Alternatively, the gasket 204 can be placed in position inside cap portion 202, and then the base portion 206 can be positioned inside the cap portion 202. While still immersed in fluid 502, pressure is then applied between the cap portion and the base portion, such that gasket 204 is pressed between the cap and base, and the soft polymer coatings 400, 402, 404 and 408 are preferably subjected to sufficient pressure that they deform and create a tight seal between the gasket and the cap and base portions. While this pressure is being applied, the area 226 of the metal cap 208 is crimped, thereby locking the base portion in position. Alternatively, the crimping alone can provide the required pressure between the base portion and the cap portion, to deform the soft polymer coating and create the seal.

FIG. 5 shows a cross sectional view of the assembled lens with fluid 500 shown both at a time when no voltage is applied between the electrodes (line A) and at a time when a voltage is applied between the electrodes (line B). Polymer coatings 400, 402, 404 and 406 are also shown providing the seal between the gasket 204 and the cap portion 202 and base portion 206.

The absolute and relative hardness values of the gasket and the polymer coatings can contribute towards creating a good seal. Preferably, a soft polymer coating is provided, which is sufficiently soft such that it deforms and creates a hermetic seal when pressure is created between the base portion and cap portion. A Shore hardness (A) in the range of 20-40 for this polymer coating has been found to work well, where Shore hardness (A) is the Shore measure of hardness using a type A durometer. The polymer can be an elastomer, in particular, a fluorinated elastomer to improve chemical resistance. For example, advantageously a fluoroelastomer, such as, Sifel (a polymer having a perfluoropolyether backbone with a terminal silicone cross-linking group, commercialized by Shin-Etsu) could be used, applied in a thin homogeneous film of between 10 and 30 micrometers in thickness, e.g., by dilution in a fluorinated solvent, which could comprise for example, HFE7200 (3M) or Thinner S-100 (Shin Etsu) or equivalent products. The coating is chemically compatible with the fluids of the lens, such that it will not be degraded during use. In alternative embodiments the coating could be comprised of other types of materials. For example, fluorocarbons FKM (fluoroelastomers) could be used, such as some grades of the brand Viton from Dupont. Alternatively EPDM (Ethylene-Propylene-Diene-Monomer), or types of silicones or fluorosilicones could be used.

The gasket 204 preferably has a Shore hardness (D) in the range of 40 to 70, where Shore hardness (D) is the Shore measure of hardness using a type D durometer. The gasket should be soft enough to be deformed by pressure of the metal cap 208 in region 226 during crimping and should be chemically resistant to the liquids used in the lens. It should, however, be hard enough to apply sufficient pressure on the soft polymer coating, so that the soft polymer is deformed to create the tight seal.

Furthermore, the gasket should have an absorption level of less than 1% for the liquid of the lens, to avoid any liquids or chemicals dissolved in the liquids being absorbed during the lifetime of the lens. Absorption of chemicals, in particular, would lead to a non-stable performance of the lens, for example, because of a change in the formulation of the liquids. The gasket could be formed of a PTFE (polytetrafluoroethylene) for example, some grades of the brand name TEFLON (from Dupont de Nemours) could be used. Alternatively, the gasket could be comprised of a ceramic material or a composite material.

Figure 6:
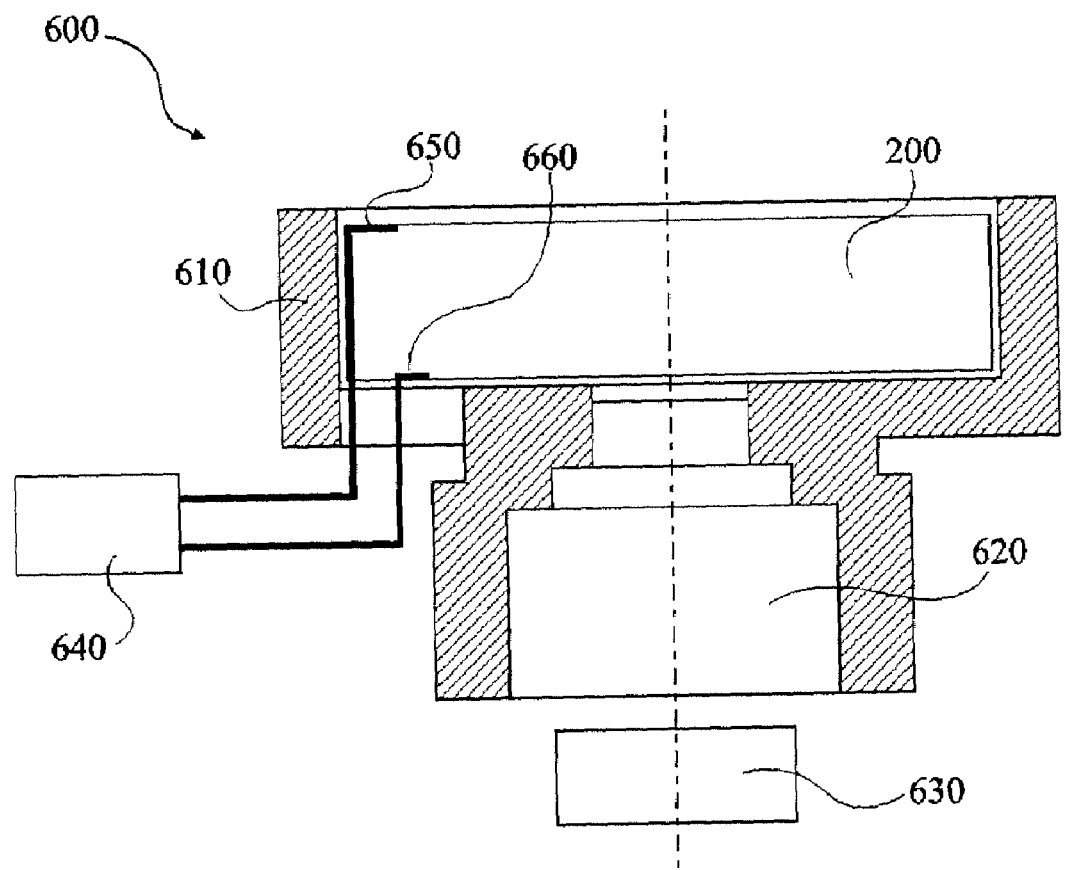
FIG. 6 is a schematic view of part of a mobile phone including an optical device with a variable focus lens according to an embodiment of the invention.

FIG. 6 illustrates in schematic form an example of an optical device 600 incorporating a lens 200 of variable focal length according to the embodiment of FIG. 2. The optical device comprises a mount 610 that holds the variable focus lens 200 and a group 620 of fixed lens. It further comprises a control block 640 for controlling the lens 200, the control block 640 being connected to the electrodes of the lens 200 through the connections 650, 660. An optical sensor array 630 is provided for capturing images received via the lenses 200 and 620.

The optical device 600 can be incorporated in a large variety of systems in which there is a need for miniaturized variable focal length optical devices, such as, for example, mobile phones, endoscope systems, etc.

Embodiments of variable focus lens are described in co-pending European Application No. 05111183, in the name of the present applicant.

Thus, according to one embodiment of the present invention, a liquid lens housing advantageously comprises a cap portion and a base portion separated by a gasket, at least one of the contact surfaces between the gasket and the cap and base having a polymer coating, advantageously softer than the material forming the gasket. Whereas several preferred embodiments of such a lens and of a method of manufacturing the same have been described with reference to the figures, there are numerous alternatives or modifications that will obvious to those skilled in the art.

Although the exemplary embodiments of the invention described reside in the context of a variable lens, the present invention is useful for all electrowetting devices in which a seal is required to contain liquids. For example, a liquid optical diaphragm could be sealed according to the methods described herein.

While in some of the described embodiments a thin film is applied to both the gasket 204 and the contact surfaces of the base and cap portions, if a slightly thicker film is provided then this need only be applied once between the gasket and each contact surface. For example, the polymer coating could be applied only to the inner and outer surfaces of the gasket, and not to the cap and base portions. Alternatively the polymer coating could be applied only to the contact surfaces on the cap and base portions and not to the gasket. Furthermore, a single film applied between either the gasket and one of the other contact surfaces of the base or the cap will alone provide improved hermeticity of the device.

While windows 210 and 238 of the lens are rectangular in cross-section in the embodiments of the figures, thus having neutral optical properties for light entering the lens, in alternative embodiments one or both of these windows could themselves be lenses, either convex or concave.

Preferred examples of the shapes of the metal cap 208, the gasket 204 and the annular electrode 236 have been described, but many alternatives to these shapes are possible while retaining some or all of the advantages of the described embodiments. Furthermore, the cap and base portions need not be crimped together, but could be pressed and maintained together with a fastening mechanism, such as, for example, glue, welded or fixed together in some other way. However, crimping provides the advantages of a cheap and efficient means of holding the cap and base portions together under force.

The lens embodiments in the figures typically have a thickness in the region of a few millimeters, but in alternative embodiments it could be smaller or larger than this, depending on the requirements. The dimensions of the gasket and the other components of the lens will also vary based on the overall size of the lens.

The approximate hardness of the gasket and the polymer film have been provided as examples, but in certain situations harder or softer materials could be used. The gasket is preferably a non-elastomer, and the polymer films are preferably elastomers; however in certain embodiments, the gasket could be an elastomer, and the polymer films non-elastomers.

Having thus described at least one illustrative embodiment of the invention, various alterations, modifications and improvements will readily occur to those skilled in the art. Such alterations, modifications and improvements are intended to be within the scope of the invention. Accordingly, the foregoing description is by way of example only and is not intended to be limiting. The invention is limited only as defined in the following claims and the equivalent thereto.

The invention claimed is:

1. An electrowetting device, comprising: first and second immiscible fluids defining an interface moveable by electrowetting, the liquids being sealed within a structure comprising:
   a cap portion;
   a base portion;
   a gasket formed of a first material positioned between a first contact surface on said cap portion and a second contact surface on said base portion; and
   a first film formed of a second material between said gasket and one of said first contact surface and said second contact surface.

2. The electrowetting device of claim 1, wherein said first material is comprised of a first polymer material and said second material is comprised of a second polymer material.

3. The electrowetting device of claim 1, wherein said first material is harder than said second material.

4. The electrowetting device of claim 1, wherein said first film is formed between said gasket and said first contact surface, and further comprising a second film formed of said second material between said gasket and said second contact surface.

5. The electrowetting device of claim 4, wherein said first film is made of a polymer coating applied to at least one of a first side of said gasket and said first contact surface, and said second film is made of a polymer coating applied to at least one of a second side of said gasket and said second contact surface.

6. The electrowetting device of claim 4, wherein said first and second films have a Shore hardness (A) in the range of 20 to 40.

7. The electrowetting device of claim 1, wherein said gasket has a Shore hardness (D) in the range of 40 to 70.

8. The electrowetting device of claim 1, wherein said second material comprises a fluorinated elastomer.

9. The electrowetting device of claim 1, wherein said first film comprises a polymer having a perfluoropolyether backbone with a terminal silicone cross-linking group.

10. The electrowetting device of claim 1, wherein said first material is comprised of a non-elastomer.

11. The electrowetting device of claim 1, wherein said gasket is formed of PTFE.

12. The electrowetting device of claim 1, wherein said cap portion is crimped such that it is fixed to said base portion.

13. The electrowetting device of claim 1, wherein said gasket is annular in shape and essentially "L"-shaped in cross-section.

14. A method of manufacturing an electrowetting device that contains first and second immiscible fluids, the method comprising:
   providing a cap portion having a first contact surface, a base portion having a second contact surface and a gasket formed of a first material having a first side for contact with said first contact surface and a second side for contact with said second surface;
   forming at least a first film of a second material on at least one of said first contact surface, said first side of said gasket, said second contact surface, and said second side of said gasket;
   positioning said gasket between said cap portion and said base portion and positioning said first and second fluids between said base and cap portions; and
   applying an amount of pressure such that said gasket and said first film are compressed sufficiently to create a seal between said cap portion and said base portion for sealing said first and second fluids within.

15. The method of claim 14, wherein said first material is harder than said second material.

16. The method of claim 14, wherein said at least first film is formed by applying a polymer diluted with a solvent.

17. The method of claim 14, wherein said step of applying pressure comprises crimping said cap portion such that it is fixed to said base portion.

18. The method of claim 14, wherein said step of forming said at least first film comprises forming said first film on at least one of said first contact surface and said first side of said gasket, and further comprising the step of forming a second film comprising forming said second film on at least one of said second contact surface and said second side of said gasket.

19. A variable focus lens, comprising: first and second immiscible fluids having different refractive indices, defining a light-focusing interface moveable by electrowetting, the liquids being sealed within a structure comprising:
   a cap portion;
   a base portion;
   a gasket formed of a first material positioned between a first contact surface on said cap portion and a second contact surface on said base portion;
   a first film formed of a second material between said gasket and one of said first contact surface and said second contact surface.

20. An optical diaphragm, comprising: first and second immiscible fluids, defining an interface moveable by electrowetting, the liquids being sealed within a structure comprising:
   a cap portion;
   a base portion;
   a gasket formed of a first material positioned between a first contact surface on said cap portion and a second contact surface on said base portion; and a first film formed of a second material between said gasket and one of said first contact surface and said second contact surface.

21. A camera module comprising the variable focus lens of claim 19.

22. A mobile phone comprising the camera module of claim 21.

* * * * *

UNITED STATES PATENT AND TRADEMARK OFFICE
CERTIFICATE OF CORRECTION

PATENT NO.         : 7,576,922 B2
APPLICATION NO. : 11/609638
DATED              : August 18, 2009
INVENTOR(S)       : Marianne Stempel et al.

Page 1 of 1

It is certified that error appears in the above-identified patent and that said Letters Patent is hereby corrected as shown below:

On the Title Page, Item (75) Inventors, the first inventor's city of residence "Lyons" should read --Lyon--.

On the Title Page, Item (75) Inventors, the third inventor's city of residence "Lyons" should read --Lyon--.

On the Title Page, Item (73) Assignee, the city "Lyons" should read --Lyon--.

Signed and Sealed this

Thirteenth Day of October, 2009

David J. Kappos
*Director of the United States Patent and Trademark Office*